US007428353B1

(12) United States Patent
Milanovic et al.

(10) Patent No.: US 7,428,353 B1
(45) Date of Patent: Sep. 23, 2008

(54) MEMS DEVICE CONTROL WITH FILTERED VOLTAGE SIGNAL SHAPING

(75) Inventors: Veljko Milanovic, El Cerrito, CA (US); Kenneth Castelino, Brooklyn, NY (US)

(73) Assignee: Adriatic Research Institute, Berkeley, CA (US)

( * ) Notice: Subject to any disclaimer, the term of this patent is extended or adjusted under 35 U.S.C. 154(b) by 116 days.

(21) Appl. No.: 11/465,835

(22) Filed: Aug. 21, 2006

Related U.S. Application Data (63) Continuation-in-part of application No. 11/003,271, filed on Dec. 2, 2004, now Pat. No. 7,295,726.

(60) Provisional application No. 60/526,510, filed on Dec. 2, 2003, provisional application No. 60/710,250, filed on Aug. 22, 2005.

(51) Int. Cl.
    G02B 6/26 (2006.01)
    G02B 6/35 (2006.01)
(52) U.S. Cl. ............................. 385/18; 385/14; 385/16; 385/17
(58) Field of Classification Search ...................... None
    See application file for complete search history.

(56) References Cited

U.S. PATENT DOCUMENTS

| 4,662,746 | A | 5/1987 | Hornbeck | 359/223 |
|---|---|---|---|---|
| 4,710,732 | A | 12/1987 | Hornbeck | 359/291 |
| 4,956,619 | A | 9/1990 | Hornbeck | 359/317 |
| 5,061,049 | A | 10/1991 | Hornbeck | 359/224 |
| 5,079,545 | A | 1/1992 | Priem | 345/628 |
| 5,083,857 | A | 1/1992 | Hornbeck | 359/291 |

(Continued)

OTHER PUBLICATIONS

D. H. Hah, et al., "Theory and Experiments of Angular Vertical Comb-Drive Actuators for Scanning Micromirrors", IEEE Journal of Selected Topics in Quantum Electronics, vol. 10, No. 3, May/Jun. 2004, p. 505-513.

(Continued)

Primary Examiner—M. R. Connelly-Cushwa
(74) Attorney, Agent, or Firm—Joshua D. Isenberg; JDI Patent (57) ABSTRACT

A MEMS system is disclosed. The system includes a MEMS device having including a gimbal-less device mount supported by two or more bi-axial linkages. Each bi-axial linkage is mechanically coupled between the device mount and an actuator. Each bi-axial linkage is distinct from the actuator. Each bi-axial linkage includes a first flexure beam configured to flex about a first axis and a second flexure beam attached to the first flexure beam. The second flexure beam is configured to flex about a second axis. The two or more bi-axial linkages provide the device mount with two or more degrees of freedom of movement. The bi axial linkages and device mount are formed from the same device layer. The MEMS device has a mechanical response that is approximately proportional to a square of a drive voltage. A signal converter is adapted to convert a signal representing a desired position of the MEMS device to a voltage and a filter is coupled to the signal converter. The filter has a substantially flat group delay response. The filter doesn't retain any frequencies at or near a natural resonant frequency $\omega_n$ of the MEMS device. An output of the filter or signal converter is coupled to MEMS device to provide the drive voltage.

22 Claims, 9 Drawing Sheets

U.S. PATENT DOCUMENTS

| | | | | |
|---|---|---|---|---|
| 5,105,369 | A | 4/1992 | Nelson | 250/201.4 |
| 5,172,262 | A | 12/1992 | Hornbeck | 359/223 |
| 5,278,652 | A | 1/1994 | Urbanus | 348/571 |
| 5,469,302 | A | 11/1995 | Lim | 359/846 |
| 5,535,047 | A | 7/1996 | Hornbeck | 395/295 |
| 5,661,591 | A | 8/1997 | Lin et al. | 359/290 |
| 6,480,320 | B2 | 11/2002 | Nasiri | 359/291 |
| 6,593,677 | B2 | 7/2003 | Behin et al. | 310/309 |
| 6,822,776 | B2 * | 11/2004 | Hah et al. | 359/224 |
| 6,865,313 | B2 | 3/2005 | Mao et al. | 385/18 |
| 7,295,726 | B1 | 11/2007 | Milanovic et al. | 385/18 |
| 2002/0071169 | A1 | 6/2002 | Bowers | 359/291 |
| 2002/0075554 | A1 | 6/2002 | Brophy | 359/291 |
| 2004/0081391 | A1 | 4/2004 | Ko et al. | 385/18 |
| 2004/0227984 | A1 * | 11/2004 | Yamabana et al. | 359/290 |
| 2004/0252936 | A1 | 12/2004 | Despont net al. | 385/18 |
| 2005/0018322 | A1 | 1/2005 | Ben-Gad et al. | 359/846 |
| 2008/0013143 | A1 * | 1/2008 | Ide et al. | 359/223 |

OTHER PUBLICATIONS

V. Milanović, et al., "Monolithic Silicon Micromirrors with Large Scanning Angle," *Optical MEMS'01*, Okinawa, Japan, Sep. 2001.

R. Conant, et al, "A Flat High-Frequency Scanning Micromirror," *Proc. Solid-State Sensor and Actuator Workshop*, Hilton Head, South Carolina, pp. 6-9, Jun. 4-8, 2000.

J. T. Nee, et al, "Lightweight, optically flat micromirrors for fast beam steering," 2000 IEEE/LEOS Int. Conference on Optical MEMS, Kauai, HI, Aug. 21-24, 2000, p. 9-10.

U. Krishnamoorthy, O. Solgaard, "Self-Aligned Vertical Comb-drive Actuators for Optical Scanning Micromirrors," 2000 IEEE/LEOS International Conference on Optical MEMS, Okinawa, Japan, Sep. 2001.

V. Milanović, "Multilevel-Beam SOI-MEMS Fabrication and Applications," J. of Microelectromechanical Systems, vol. 13, No. 1, pp. 19-30, Feb. 2004.

V. Milanović, S. Kwon, L. P. Lee, "Monolithic Vertical Combdrive Actuators for Adaptive Optics," IEEE/LEOS Int. Conference on Optical MEMS, Switzerland, Aug. 2002.

S. Kwon, V. Milanović, L. P. Lee, "Vertical Microlens Scanner for 3D Imaging," *Proc. Solid-State Sensor and Actuator Workshop*, Hilton Head, South Carolina, Jun. 2002.

S. Kwon, V. Milanović, L. P. Lee, "A High Aspect Ratio 2D Gimbaled Microscanner with Large Static Rotation," IEEE/LEOS Int. Conf. on Optical MEMS'02, Switzerland, Aug. 2002.

H. Schenk, et al, "Large Deflection Micromechanical Scanning Mirrors for Linear Scans and Pattern Generation," IEEE J. of Selected Topics in Quantum Electronics, vol. 6, No. 5, Sep./Oct. 2000.

T. Brosnihan, et al, "Embedded Interconnect and Electrical Isolation for High-Aspect-Ratio, SOI Inertial Instruments," Proceedings of the 1997 Int. Conf. on Solid-State Sensors and Actuators, Chicago, Jun. 16-19, 1997, p. 637-640.

V. Milanović, G. Matus, T. Cheng, B. Cagdasar, "Monolithic High Aspect Ratio Two-axis Optical Scanner in SOI," Int. Conf. on Microelectromechanical Systems, MEMS2003, Kyoto, Japan, pp. 255-258, Jan. 2003.

F. Niklaus, S. Haasl and G. Stemme, "Arrays of monocrystalline silicon micromirrors fabricated using CMOS compatible transfer bonding," J. of MEMS, v 12, n 4, Aug. 2003, p. 465-469.

U. Srinivasan, et al, "Fluidic self-assembly of micromirrors onto microactuators using capillary forces," IEEE J. of Spec. Topics in Quantum Electronics, vol. 8 (1), pp. 4-11, Jan. 2002.

C. Rembe, et al, "Stroboscopic interferometer with variable magnification to measure dynamics in an adaptive-optics micromirror," 2000 IEEE/LEOS Int. Conf. on Optical MEMS, Aug. 21-24, 2000.

J.-C. Tsai, et al, "Analog Micromirror Arrays with Orthogonal Scanning Directions for Wavelength Selective 1xN2 Switches," Transducers '03, pp. 1776-1779, Jun. 2003.

J.-L. A. Yeh, et al, "Electrostatic Model for an Asymmetric Combdrive", *J. of MEMS*, vol. 9, No. 1, Mar. 2000.

Jin-Ho Lee et al "Fabrication of silicon optical scanner for laser display," 2000 IEEE/LEOS International Conference on Optical MEMS, Kauai, HI, Aug. 21-24, 2000, p. 13-14.

J. M.-L. Tsai, H.-Y. Chu, J. Hsieh, and W. Fang, "The BELST II process for a silicon high-aspect-ratio micromaching vertical comb actuator and its applications," J. Micromechanics and Microengineering 14, pp. 235-241, Nov. 2003.

V. Milanović, S. Kwon, L. P. Lee, "High Aspect Ratio Micromirrors With Large Static Rotation and Piston Actuation", IEEE Photonics Technology Letters, vol. 16, No. 8, Aug. 2004, p. 1891-1893.

"MEMS Precision Instruments" downloaded from Internet, downloaded from <http://www.memspi.com> on Mar. 1, 2006.

V. Milanović, "Multilevel-Beam SOI-MEMS for Optical Applications," *Proc. 9th IEEE Int. Conf. on Electronics, Circuits and Systems—ICECS'02*, Dubrovnik, Croatia, Sep. 2002. pp. 281-285.

V. Milanović, D. T. McCormick, G. Matus, "Gimbal-less Monolithic Silicon Actuators For Tip-Tilt-Piston Micromirror Applications," *IEEE J. of Select Topics* in Quantum Electronics, vol. 10 , Issue: 3, May-Jun. 2004, pp. 462-471.

V. Milanović, K. Castelino, "Sub-100 μs Settling Time and Low Voltage Operation for Gimbal-less Two-Axis Scanners", IEEE/LEOS Optical MEMS 2004, Takamatsu, Japan, Aug. 2004.

V. Milanovic, "Sub-100 μs Settling Time and Low Voltage Operation for Gimbal-less Two-Axis Scanners" presented at the IEEE/LEOS Optical MEMS 2004, Takamatsu, Japan, Aug. 24th, 2004.

U.S. Appl. No. 11/003,271, entitled "Gimbal-Less Micro-Electro-Mechanical-System Tip-Tilt and Tip-Tilt-Piston Actuators and a Method for Forming the Same", to Veljko Milanovic et al., filed Dec. 2. 2004.

D. Hal, et al. "A Self-Aligned Vertical Comb-Drive Actuator on an SOI Wafer for a 2D Scanning Micromirror", Institute of Physics Publishing, Journal of Micromechanics and Microengineering, 2004, vol. 14, p. 1148-1156.

Office Action in U.S. Appl. No. 11/003,271, dated Apr. 5, 2006.

Final Office Action in U.S. Appl. No. 11/003,271, dated Oct. 26, 2006.

Office Action in U.S. Appl. No. 11/003,271, dated Feb. 16, 2007.

Notice of Allowability in U.S. Appl. No. 11/003,271, dated Jun. 28, 2007.

* cited by examiner

$$H^{-1}(s) \cdot \frac{p_1 \cdot p_2}{(s+p_1)(s+p_2)}$$

MEMS DEVICE CONTROL WITH FILTERED VOLTAGE SIGNAL SHAPING

CROSS-REFERENCE TO RELATED APPLICATION

This application is a continuation-in-part of and claims the benefit of prior U.S. application Ser. No. 11/003,271 filed Dec. 2, 2004 now U.S. Pat. No. 7,295,726, which, in turn claims priority to provisional application No. 60/526,510 filed Dec. 2, 2003. The present application hereby claims priority to U.S. Provisional patent application No. 60/526,510. Priority is also hereby claimed to U.S. Provisional patent application No. 60/710,250 filed Aug. 22, 2005. The entire disclosures of U.S. patent application Ser. No. 11/003,271 and U.S. Provisional Patent Application 60/526,510 and U.S. Provisional Patent Application 60/710,250 are incorporated herein by reference.

FIELD OF THE INVENTION

This invention relates generally to microelectromechanical systems (MEMS). More particularly, it relates to control signals for MEMS devices.

BACKGROUND OF THE INVENTION

Microelectromechanical systems (MEMS) devices generally have a high mechanical Q (e.g., 50 to 100) and device position is usually a non-linear function of applied voltage, especially in the case of gap-closing actuators. This behavior makes actuation and control of MEMS devices challenging. The transient device performance and control schemes for optimizing device characteristics such as settling time are critical in many applications and are not often reported. Schemes for closed-loop control of MEMS devices using proportional-integral-differential (PID) controllers or adaptive controllers have been proposed. Such schemes may alleviate the above difficulties but require position sensors and often complex circuitry. Open-loop control schemes using various filters and pulse-shaping are simpler to implement for many applications. However, such schemes may not be able to operate at low voltages.

It is within this context that embodiments of the present invention arise.

DETAILED DESCRIPTION OF THE PREFERRED EMBODIMENTS

Embodiments of the present invention address the issue of long settling times for MEMS systems having low damping ratios. If a step function signal is applied to drive a MEMS system having a low damping ratio, the system can oscillate, or "ring" for a long time compared to some desired settling time. For a MEMS device having an actuator that tilts, the settling time may be defined as the amount of time it takes after a signal to position the actuator at a desired angle for the actuator to settle to within a cone of about 1% of the desired angle. Some form of filtering is desirable to achieve settling of a MEMS device.

MEMS micromirror devices generally have high mechanical Q (50 to 100) and micromirror position is usually a non-linear function of applied voltage, especially in the case of gap-closing actuators, which makes their actuation and control challenging. Since electrostatic force between any two plates is proportional to the square of their voltage difference, even the most properly designed combdrive types of electrostatic actuators are by nature nonlinear. In that case they are governed by a square law. The transient device performance and control schemes for optimizing device characteristics such as settling time, which are critical in most applications, are not often reported. Schemes for closed-loop control of micromirrors using PID or adaptive controllers have been proposed, which alleviate above difficulties but require position sensors and often complex circuitry. Open-loop control schemes using various filters and pulse-shaping are simpler to implement and may be sufficient for many applications. Even in the case of closed-loop control of such a MEMS device, it may be possible to further improve response by utilizing some special form of filtering, based on detailed knowledge of the devices electro-mechanical properties (e.g. it's static and dynamic response curves.)

Embodiments of the present invention utilize a combination of one-axis vertical comb-drive based rotation actuators and bi-axial mechanical linkages that allow 2 DoF of rotation (tip-tilt,) or 3 DoF of motion (tip-tilt-piston) for a central structural support for an optical element such as a micromirror. The comb-drive actuators can by themselves achieve >20° of static optical deflection at frequencies of up to several kHz (with a 600 μm diameter and 30 μm thick silicon micromirror attached to the support). Such a configuration can effectively decouple the problem of two-axis scanners and can independently optimize and approach the problem of improving one-axis rotators, as well as the linkages that form the overall 2 DoF structure. While many embodiments described herein use comb-drive rotators to produce the actuation of the central support, the design can also utilize pure vertical actuators, gap-closing electrodes or piston actuators.

The basis of the fabrication methodology is that a monolithic substrate of single crystal silicon (or similar material, SiGe or SiC, polysilicon, metallic depositable materials, etc.), e.g. a single-crystal silicon wafer with double-side polished front- and back-side, can be etched from the front-side and from the back-side in an aligned fashion to form three-dimensional electro-mechanical structures.

Figure 1A:
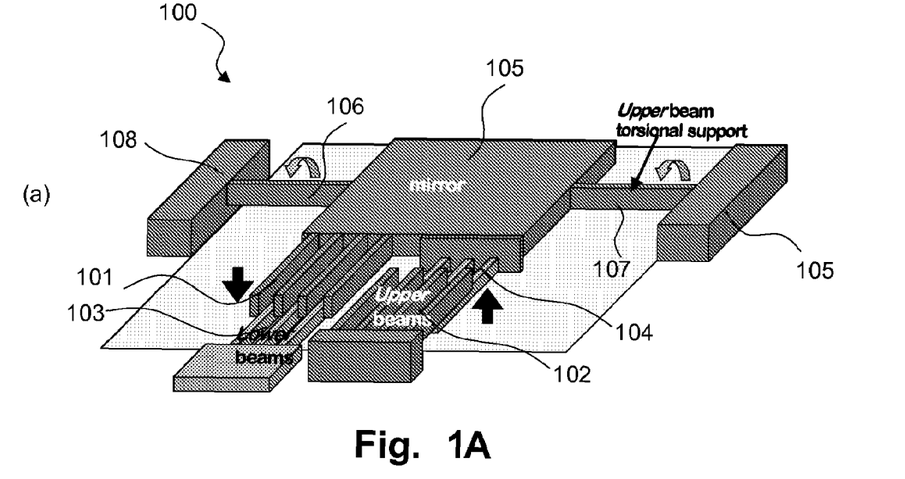
FIG. 1A shows a 3D schematic of a device that features up and down actuators and a mirror in the same rotator according to an embodiment of the invention.

Also as shown in FIG. 1A, various arrangements of upper beams 101, 102 and lower beams 103, 104 produce comb-drives that provide downward force or upward force. FIG. 1A depicts a device 100 where both combdrives are utilized side by side such that one combdrive or the other can be actuated and thereby achieve bi-directional rotation of an optical component such as a mirror 105 that is connected by flexure beams 106, 107 to anchors 108, 109. The mirror 105 is connected to a common potential (e.g. GND) while one static end of each combdrive as the counter-electrode. The mirror 105 may be made of silicon and plated with a metal such as gold, copper, aluminum or chrome or any combination thereof.

Figure 1B:
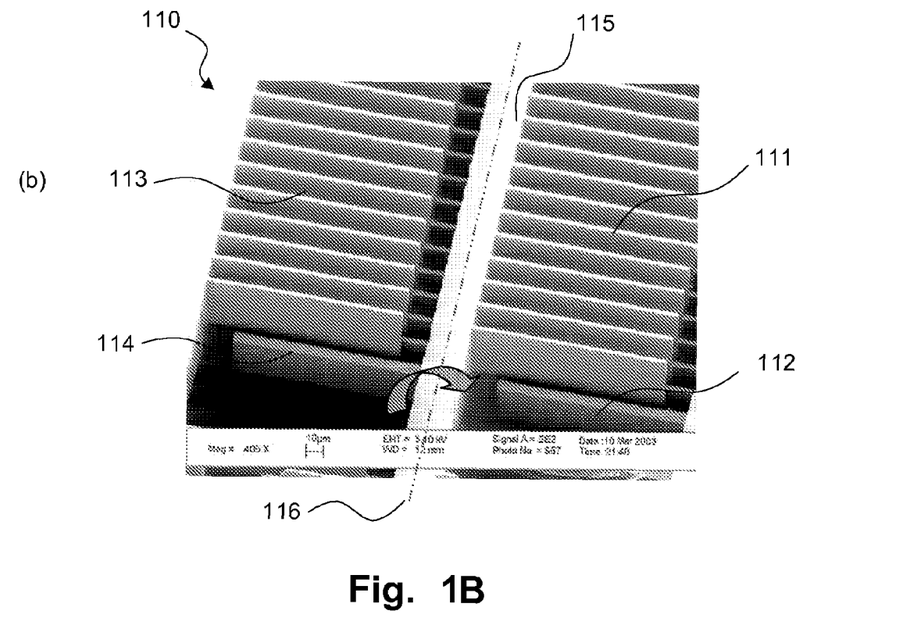
FIG. 1B is a SEM micrograph of a balanced rotator according to an embodiment of the invention.

FIG. 1B is a SEM micrograph of a balanced rotator device 110 with the preferred arrangement of combdrives to achieve substantially pure rotation. A shuttle 115 is suspended by two torsional supports not seen in the figure and can be moved by electrostatic forces on the combdrives. Combfinger sets 111 and 114 are attached to the shuttle 115 and are therefore moving combfingers. Combfinger sets 112 and 113 are fixed combfingers. The combdrive made of combfingers 111 and 112 is therefore a downward-force combdrive. The combdrive made of combfingers 113 and 114 is therefore an upward-force combdrive. By combining a downward force combdrive with an upward force combdrive on opposite sides of the rotation axis 116 (axial to the shuttle 115), and actuating both simultaneously, lateral and vertical translational forces are substantially cancelled. However, the torque from each side is combined in the same direction of rotation (clockwise for device 110 as shown in FIG. 1B)

Figure 2:
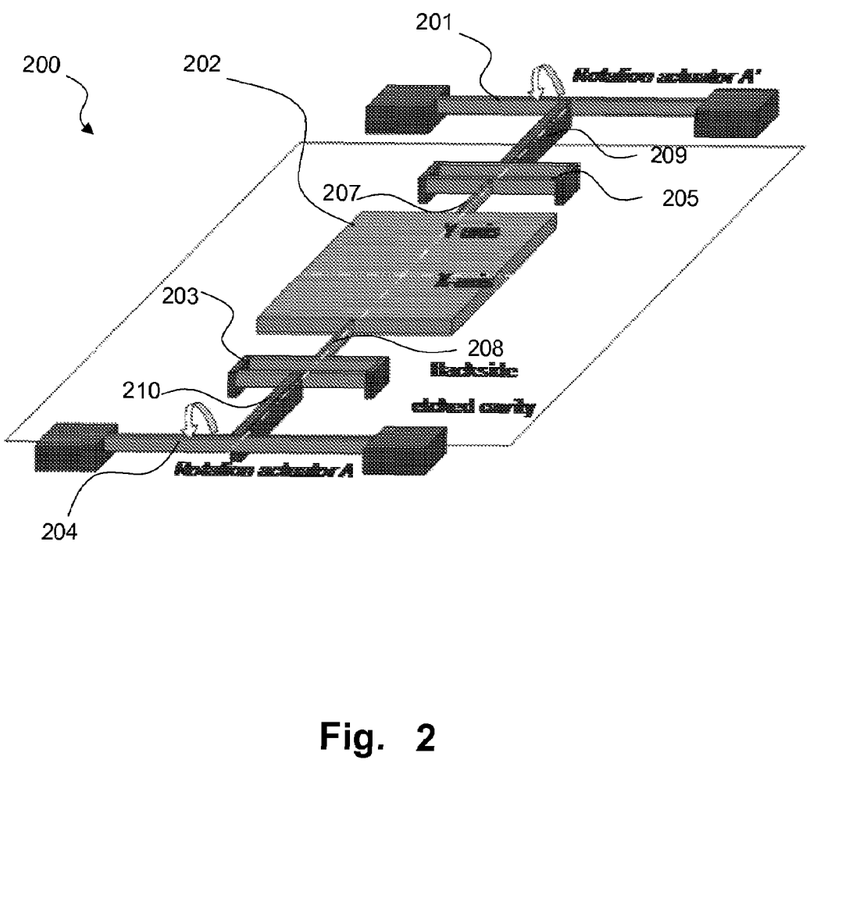
FIG. 2 is a 3D schematic of a one axis micromirror device with two rotators, two 1 DoF linkages and a mirror plate according to an embodiment of the invention.

As a step toward implementing gimbal-less two-axis devices, one-axis devices such as the device 200 depicted in the 3D schematic of FIG. 2, have been developed. The device 200 generally includes a micromirror plate 202 connected to rotation actuators 201, 204 via inside flexure beams 207, 208, rotation transformers 203, 205 and outside flexure beams 209, 210. All of these components may be fabricated from the same device layer, e.g., as described above. In particular, the rotations may be combdrive actuators of any of the types described above. One or both of the rotation transformers 203, 205 includes a flexure beam that allows rotation of the mirror plate 202 with respect to an X-axis. One or more of the flexure beams 207, 208, 209, 210 may include a beam that allows rotation of the micromirror plate 202 with respect to a Y-axis that is non-parallel (e.g., perpendicular) to the X-axis. To illustrate the principle of operation only a single pair of actuators 201, 204 that impart rotation about the X-axis are shown.

Figure 3A:
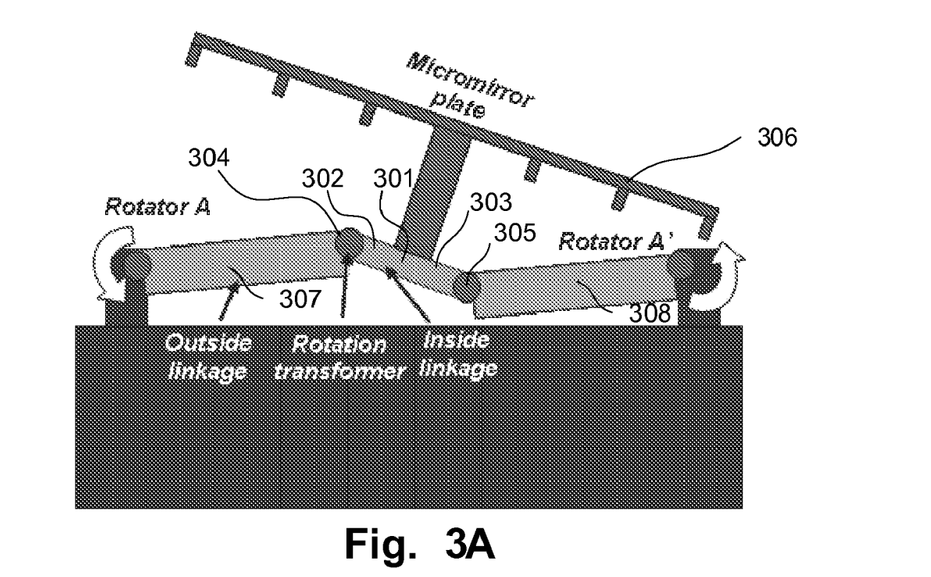
FIG. 3A is a cross-sectional diagram of a micromirror device in which opposing rotation of each rotator results in rotation of the micromirror plate which is bonded onto the optical stage and is at a level above the actuators and linkages, according to an embodiment of the invention.
Figure 3B:
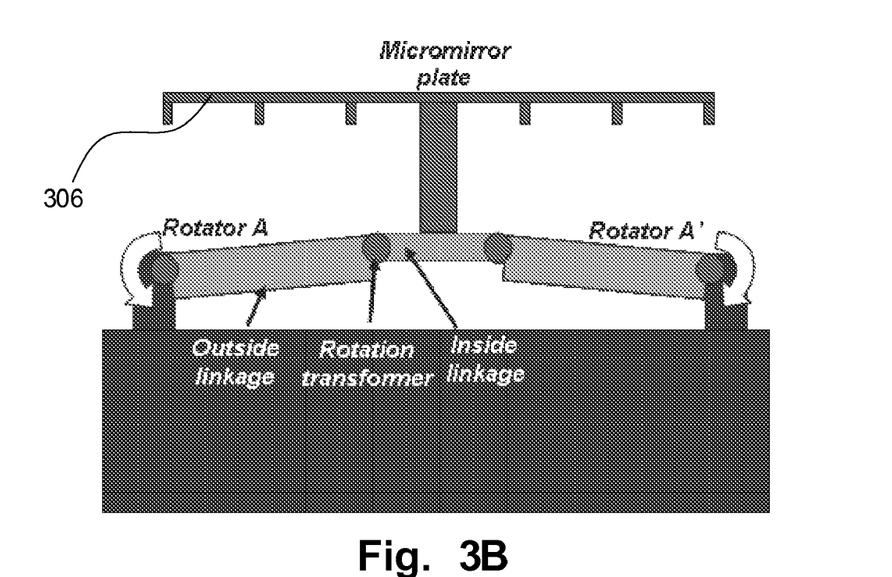
FIG. 3B is a cross-sectional diagram of a micromirror device in which common-mode rotation of each rotator results in vertical pistoning of the micromirror plate, according to an embodiment of the invention.

The device 200 operates based on the methodology shown in the cross-sectional schematics of FIG. 3A and FIG. 3B. Two rotating actuators, A, A' are placed in parallel and arranged to rotate in the same direction (e.g., counter clockwise, as shown in FIG. 3A). A device mount 301 is connected to the actuators A, A' by inside flexure beams 302, 303 rotation transformers 304, 305 and outside flexure beams 307, 308. All of these components may be formed from the same device layer. Note that in FIGS. 3A-3B, a micromirror plate 306 is attached to the device mount 301. As the rotators A, A' rotate counterclockwise the outside flexure beams 304, 305 and inside flexure beams 307, 308 impart an opposing action. Namely, although both rotators can be of balanced rotator type for "pure" rotation, the attachment of the linkage determines whether the linkage is therefore rotated up or down. The rotator A on the left in FIGS. 3A-3B actuates its outside flexure beams 307 up, while the rotator A' on the right actuates its flexure beams 308 down. As a result, the inside flexure beams 302, 303 effectively achieve rotation in the opposite (clock-wise) direction from the actuators A, A'. By the help of the linkages which act as transformers of rotation and are 1 degree of freedom (DoF) flexures, actuator rotation displaces the inside flexure beams 302, 303 in opposite directions and rotates the mirror 306 clockwise. Since the outside flexure beams 307, 308 and inside flexure beams 302, 303 experience the same vertical motion at the end of the transformer, the linkage rotation is inversely proportional to its length. Therefore, the ratio of actuator and mirror rotations can be scaled by changing the ratio of lengths of the inside flexure beams 302, 303 and corresponding outside flexure beams 307, 308. As explained above, for vertical combdrive actuators, vertical comb drive stroke is limited by the device layer thickness and is given as $S/r_1$. By scaling the flexure beams lengths however, it is possible to drive mirrors to rotation angles well beyond the rotational range of the actuators. This mechanical gain feature is explained in more detail below.

Figure 4A:
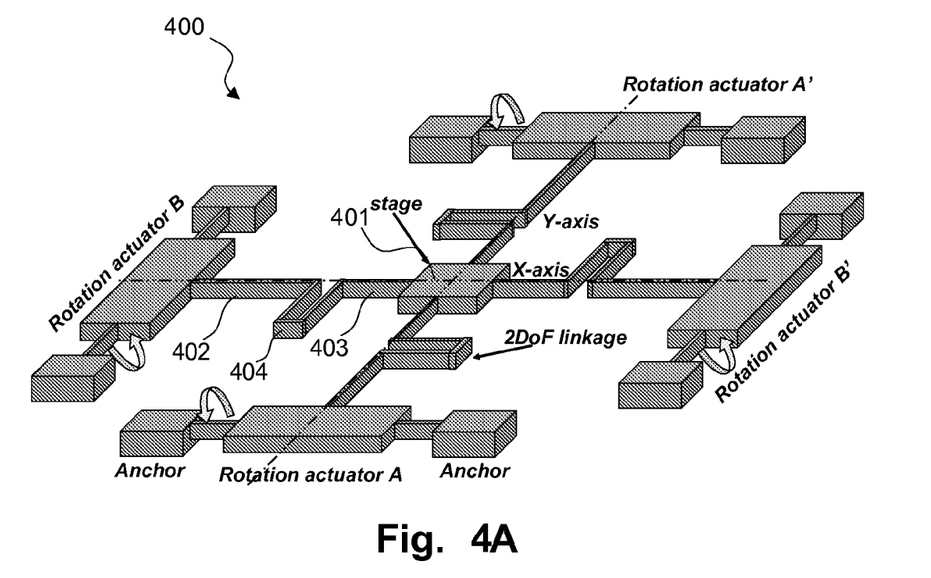
FIG. 4A is a 3D schematic of a two-axis non-gimbaled actuator with four rotators, four linkages, and an optical stage of mirror plate at the same level as the actuator and linkage according to an embodiment of the invention.
Figure 4B:
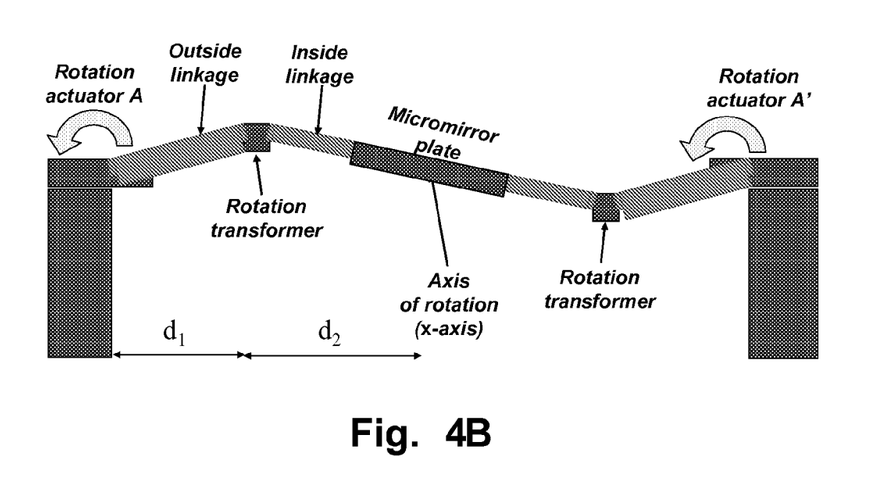
FIG. 4B is a cross-sectional diagram of the embodiment of the invention in FIG. 12A in which opposing rotation of each rotator results in rotation of the micromirror plate.
Figure 5A:
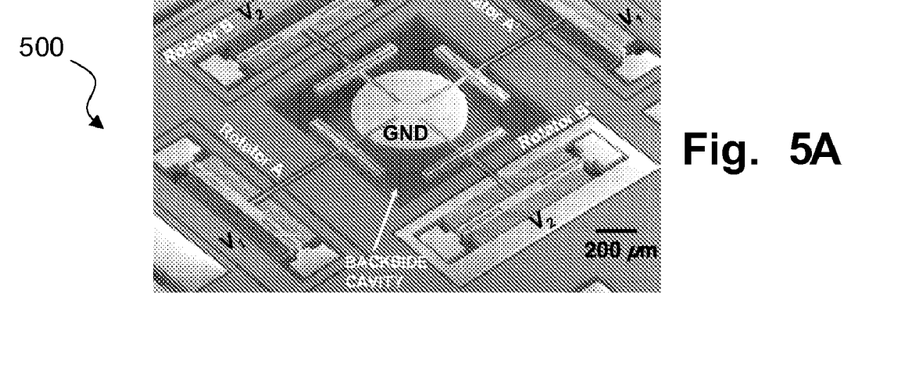
FIG. 5A is an SEM micrograph of an embodiment of the invention using four rotators which surround the micromirror on four sides, to scan in two axes.
Figure 5B:
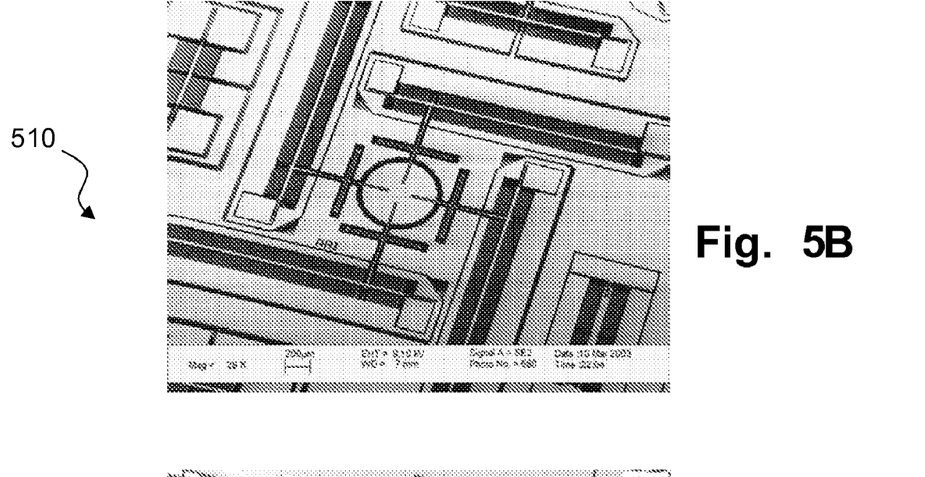
FIG. 5B is an SEM micrograph of an embodiment of the invention with an arrangement of rotators in such a way that they may extend to any desired length without crossing.
Figure 5C:
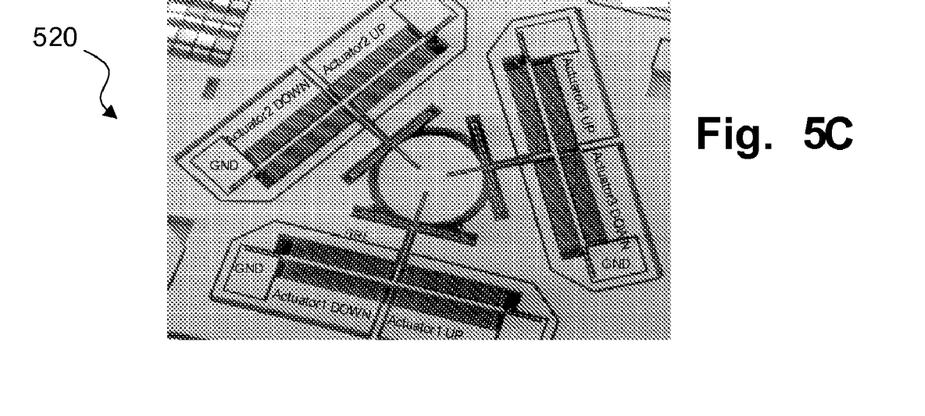
FIG. 5C is an SEM micrograph of an embodiment of the invention with three bi-directional balanced rotators to scan an integrated micromirror in 3 DoF, tip tilt and piston.

To achieve the goal of fast two-axis scanning, one can combine multiple one-axis rotators positioned orthogonally, as depicted in FIGS. 4A-4B, and utilize 2 DoF mechanical linkages to allow two-axes of rotation for a central device mount or micromirror. The problem is how to combine one-axis scanners of the types discussed above, and allow the operation of one scanner about one axis to be nearly independent of the operation of another scanner about another (non-parallel) axis. The proposed solution is schematically shown in FIG. 4A, and fabricated as devices 500, 510 depicted respectively in FIG. 5A and FIG. 5B. Specifically, two one-axis rotators are utilized for each axis of the overall 2D scanner. For the x-axis, actuators A and A' are utilized, and for the y-axis, actuators B and B'. The actuators may be comb-drive actuators of any of the types described above. Each actuator is attached to a device mount 401 (e.g., a mirror or stage) through a set of flexure beams 402, 403 and a mechanical rotation transformer 404. The rotation transformer 404 may be mechanically coupled to the device mount 401 e.g., by linkage 403. As depicted in FIG. 4B, the operation of the device 400 about a single axis may be implemented discussed above with respect to FIGS. 3A-3B. It should be added that the inside flexure beams 403 are designed such that they allow torsion on axis, specifically during the operation of the device to rotate the device mount 401 about an axis orthogonal to the torsion axis of the flexure beam. Each rotation transformer 404 includes one or more flexure beams that allows torsion on an axis that is non-parallel (e.g., perpendicular) to the corresponding flexure beam 403. In other words, the combination of the flexure beams 402, 403 and rotation transformer 404 act as a bi-axial linkage mechanically coupled between the device mount 401 and the rotators and acts as a two degree of freedom (2 DoF) mechanical component which allows rotation about one axis via the rotation transformers, and allows de-coupling from the orthogonal axis via torsional compliance, usually in the inside linkage. By way of example, each rotation transformer 404 may include a first flexure beam two flexure beams attached to each other in a spaced-apart substantially parallel relationship to the each other. Each of the flexure beams in the rotation transformer 404 may be coupled to a corresponding one of the flexure beams 402, 403. The flexure beams 402, 403 and the flexure beams in the rotation transformer 404 may be characterized by substantially different coefficients of torsional stiffness. For example flexure beam 402 may be made more flexible (e.g., having a lesser degree of torsional stiffness) than flexure beam 403 so that most of the rotation of the device mount about the x-axis is due to flexure of outside flexure beam 402.

The combination of flexure beams 402, 403 and rotation transformer 404 acts as a bi-axial linkage that is distinct from any of the rotation actuators A, A', B, B'. The flexure beams 402, 403 and rotation transformer 404 may be said to be distinct from the actuators A, A', B, B' in that the flexure beams 402, 403 and rotation transformer 404 transfer or transform rotational forces generated by the actuators A, A', B, B' but do not take part in generating those forces. As such, an actuator may be removed from a device 400 without necessarily removing the associated bi-axial linkage. Including bi-axial linkages that are distinct from the actuators thus allows both design freedom and modularity.

Figure 6A:
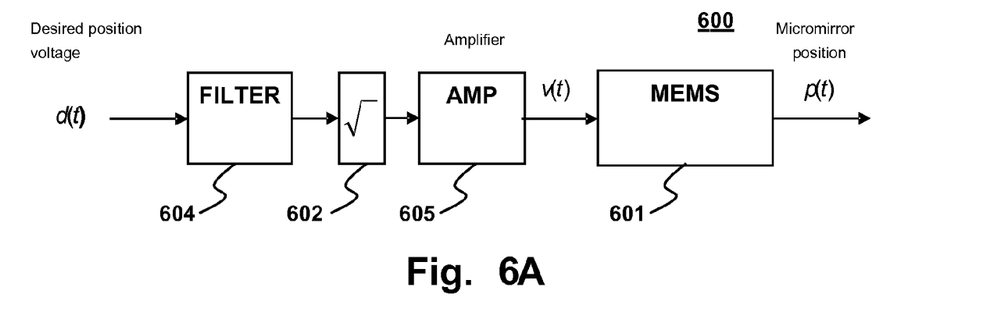
FIG. 6A is a schematic diagram illustrating a MEMS system according to an embodiment of the present invention.

FIG. 6 illustrates a MEMS system 600 according to an embodiment of the present invention. In the system 600, a MEMS device "plant" 601 is driven by a position signal d(t) that is run through a converter 602 that converts a desired position value (e.g., a tilt angle of a MEMS device) to a voltage. The converter 602 is coupled to a filter 604. The filter 604 may be of a type that reduces excitation of the MEMS device at or near a natural resonant frequency $\omega_n$ of the MEMS device 601 or a harmonic or subharmonic of the natural resonant frequency $\omega_n$. Although FIG. 6 shows the filter 604 being coupled between the converter 602 and the MEMS device 601, the invention is not limited to such a configuration. Other embodiments may reverse the order of the filter 604 and converter 602.

The signal converter 602 can convert the position signal d(t) to a voltage in any number of ways. For example, it is possible to use a position sensitive detector to measure the position (e.g., angle of deflection about a given axis) of the MEMS device 601 as a function of applied voltage. The signal converter 602 may then invert this function to enable the system to apply proper corresponding voltage to achieve any desired position. Alternatively, the signal converter 602 may approximate the voltage conversion by taking a square root of the desired position and then multiplying the result by a suitable amplification factor. This can often be a good approximation for combdrives that are governed by the square law. An optional amplifier 605 may be coupled between the signal converter 602 or filter 604 and the MEMS device 601 for this purpose.

Figure 6B:
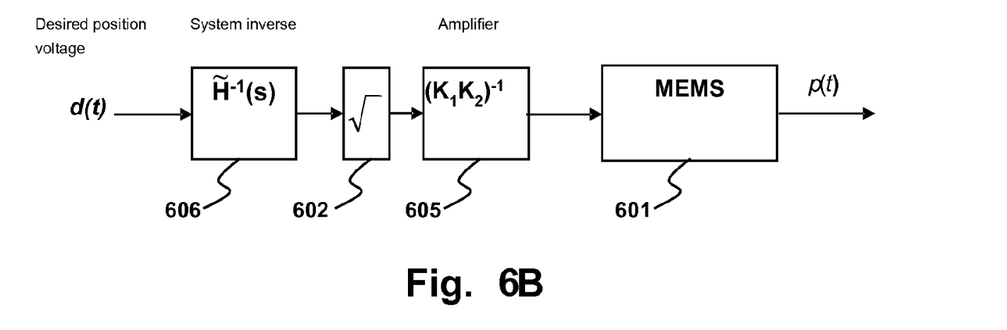
FIG. 6B is a schematic diagram illustrating a MEMS system according to an alternative embodiment of the present invention.
Figure 7:
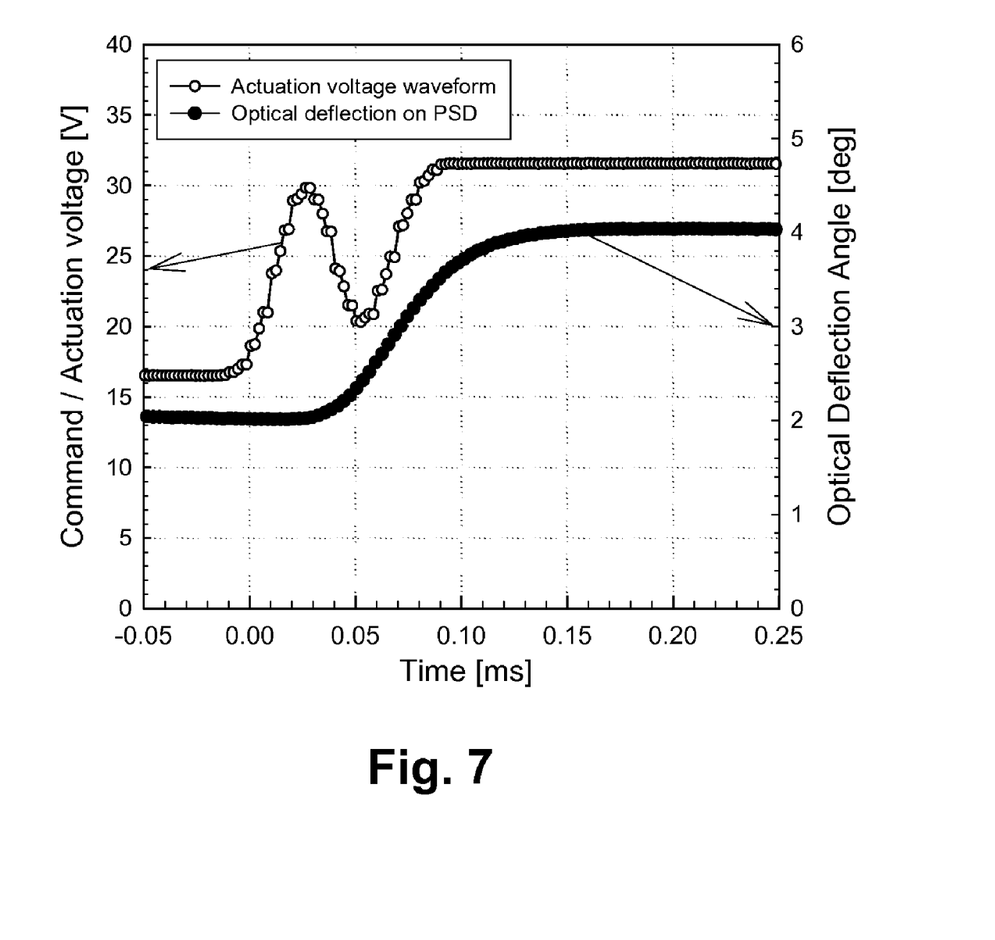
FIG. 7 is graph illustrating the excitation and measured response of such a system.

The filter 604 desirably has a substantially flat group delay response. To accomplish this, the filter 604 may be, by way of example and without limitation, a low-pass filter, notch filter, Butterworth filter or Bessel filter, such as an analog Bessel filter. By way of example, the filter 604 may be implemented as a finite impulse (FIR) filter, an infinite impulse response (IIR) filter or a FIR approximation of an IIR filter. In an alternative embodiment, depicted in FIG. 6B, the filter 604 may be in the form of a system inverse filter 606. The system inverse filter 606 is characterized by a frequency response that is approximately an inverse of the small-signal mechanical frequency response of the MEMS device 601. The use of system inverse filter 606 can achieve a device's optical deflection shown by the filled circles in the graph in FIG. 7 in response to an actuation voltage waveform as shown by the open circles.

Figure 8:
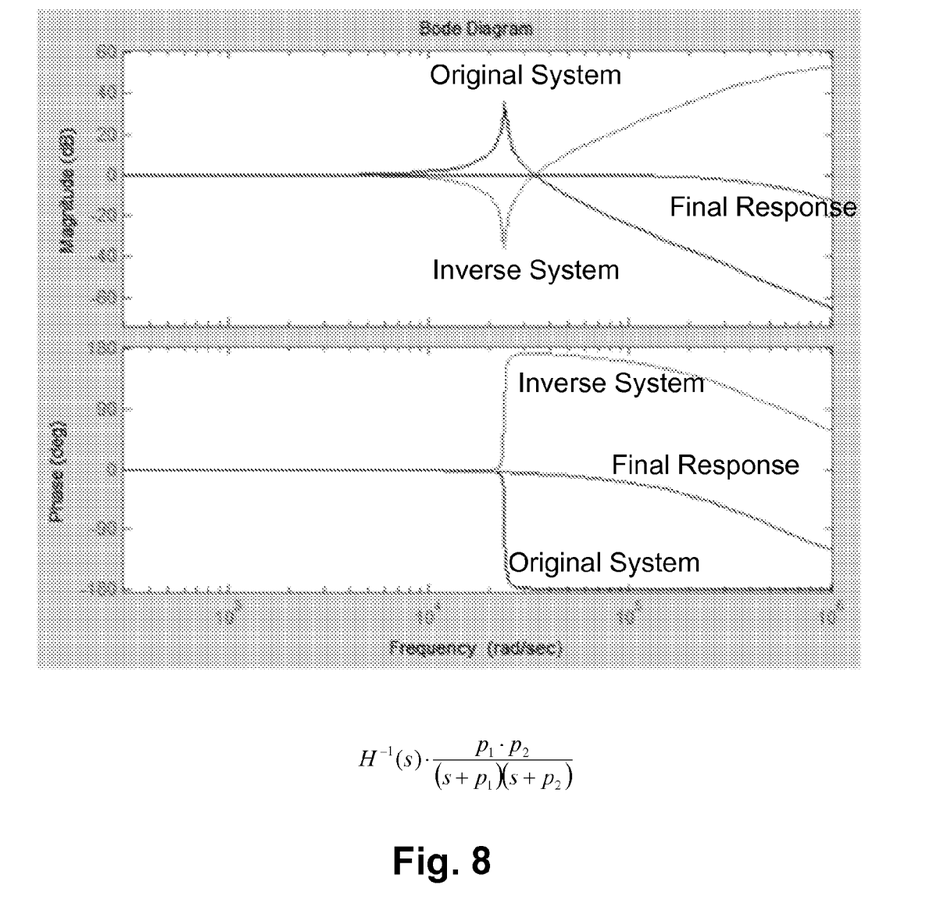
FIG. 8 depicts Bode diagrams of signal magnitude and phase illustrating the generation of an inverse response filter function according to an alternative embodiment of the invention. The equation for the inverse response filter is shown in the figure.

The graphs of FIG. 8 illustrate how such a frequency response function for the system inverse filter 606 can be generated. First a small-signal Bode plot may be generated for the MEMS device 601 in a conventional manner. This Bode plot can then be inverted using digital signal processing software to produce an inverse frequency response $H^{-1}(s)$. Additional poles may be added to obtain a physically realizable, stable and causal system. For example, the inverse of a second order system would have two zeros and no poles; such an inverse may be physically impossible to implement. This can be overcome by adding two or more poles, e.g., $p_1$, $p_2$ at frequencies outside a range of interest to form a modified frequency response $$\tilde{H}^{-1}(s) = H^{-1}(s) \cdot \frac{p_1 \cdot p_2}{(s + p_1)(s + p_2)}$$

that may be used in the filter 604. As may be seen from FIG. 8, the resulting final response for the magnitude and phase are substantially flat over a wide frequency range.

By way of example, the MEMS device 601 may be a gimbal-less two axis scanner of a type described in V. Milanović, D. T. McCormick, G. Matus, "*Gimbal-less Monolithic Silicon Actuators For Tip-Tilt-Piston Micromirror Applications,*" IEEE J. of Select Topics in Quantum Electronics, Volume: 10, Issue: 3, May-June 2004, pages 462-471, which is incorporated herein by reference. In the case of a two axis scanner, separate and independent converter and filter systems may be used to provide drive voltages for each of the two axes. Where such scanners use two or more actuator mechanisms, e.g., comb-drives, each comb-drive may receive a drive signal from an independent source that has been filtered and converted as described herein.

Figure 9:
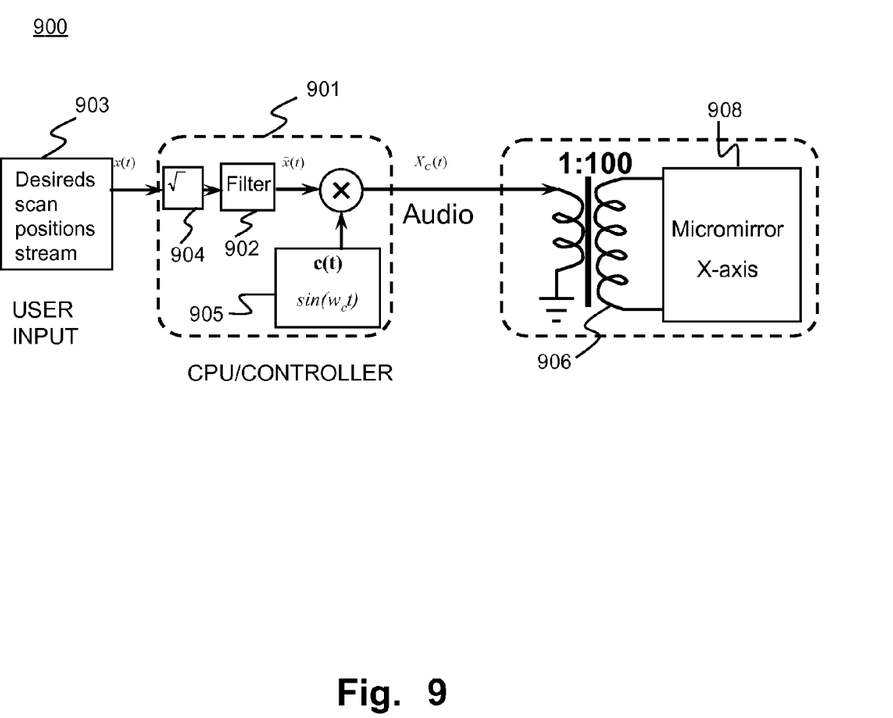
FIG. 9 is a schematic diagram illustrating a low voltage MEMS system according to another alternative embodiment of the invention.

In a particular embodiment of the invention depicted in FIG. 9, a modified system 900 is adapted for low-voltage operation. The system 900 includes controller 901 having a filter 902 and signal converter 904, which may be configured as discussed above. A scan position generator 903 produces a position signal that is fed to the controller 901. The filter 902 and converter 904 produce an output signal $\hat{x}(t)$ (e.g. low-pass filtered pulse waveform for desired angle positions) which generally contains many frequencies within the allowed bandwidth of the MEMS device. A modulator signal source 905 and a transformer 906 are coupled between a MEMS device 908 and the signal converter 904 or filter 902. The modulator signal source 905 which is a sinusoidal source at frequency $\omega_c$, is combined with the output signal $\hat{x}(t)$. The modulation in this example is AM or amplitude modulation. The result is a modulated output signal $X_c(t)$ which is applied to the transformer 906. Now it is the so-called envelope of the signal $X_c(t)$ that contains the desired control signals for the MEMS device. The transformer preferably has a flat response and a high voltage gain at around $\omega_c$ of the modulated output signal $X_c(t)$ and within a bandwidth of the modulating signal $X_c(t)$. If the MEMS device responds to the square of $X_c(t)$, but is driven at a frequency that is much larger than the natural frequency $\omega_n$ of the MEMS device 908 the MEMS device responds to the envelope of the modulated drive signal $X_c(t)$. The bode plot of the MEMS response would look like that of a low pass filter. If the turns ratio of the transformer 906 is large enough (e.g., about 1:100), a large enough signal can be provided to drive the MEMS device 908 without the need for an amplifier.

In the case of a two axis scanner, separate and independent systems such as 900 may be used to provide drive voltages for each of the two axes. Where such scanners use two or more actuator mechanisms, e.g., comb-drives, each comb-drive may receive a drive signal from an independent source that has been filtered, converted to a modulated signal, and then amplified to high-voltage modulated signal by use of one or more transformers, as described herein.

By way of example, a laptop audio port may be used as a function generator to produce $\sim 2V_{pp}$ signals at audio frequencies, such that a left audio port can carry x-axis signals and a right audio port can carry MEMS device's y-axis signals. The output voltage is raised sufficiently to operate an actuator to full 20° deflection using a 100:1 audio transformer. Additional details of various embodiments of the present invention can be found in V. Milanović, K. Castelino, "*Sub-100 µs Settling Time and Low Voltage Operation for Gimbal-less Two-Axis Scanners*", IEEE/LEOS Optical MEMS 2004, Takamatsu, Japan, August 2004 and in "Sub-100 µs Settling Time and Low Voltage Operation for Gimbal-less Two-Axis Scanners", presented by V. Milanovic at the IEEE/LEOS Optical MEMS 2004, Takamatsu, Japan, Aug. 24, 2004, both of which are incorporated herein by reference.

It will be clear to one skilled in the art that the above embodiment may be altered in many ways without departing from the scope of the invention.

The invention claimed is:

1. A MEMS system, comprising:
 a MEMS device, the MEMS device including a device mount, a first rotational actuator having a first rotation axis, a second rotational actuator having a second rotation axis, wherein the first and second rotation axes are non-parallel, a first bi-axial linkage coupled between the device mount and the first rotational actuator without an intervening frame, wherein the first biaxial linkage includes a first flexure beam configured to flex about a first flexure axis and a second flexure beam configured to flex about a second flexure axis that is non-parallel to the first flexure axis; and
 a second bi-axial linkage coupled between the device mount and the second rotational actuator without an intervening frame, wherein the second biaxial linkage includes a third flexure beam configured to flex about a third flexure axis and a fourth flexure beam configured to flex about a fourth flexure axis that is non-parallel to the third flexure axis, wherein the first and second bi-axial linkages provide the device mount with two or more degrees of freedom of movement, wherein the first and second bi-axial linkages and device mount are formed from the same device layer; wherein the MEMS device has a mechanical response that is approximately proportional to a square of a drive voltage;
 a signal converter adapted to convert a signal representing a desired position of the MEMS device to a voltage;
 a filter coupled to the signal converter;
 wherein an output of the filter or signal converter is coupled to the MEMS device to provide the drive voltage.

2. The system of claim 1 wherein the filter is an analog or digital low pass filter, Bessel filter, Butterworth filter, or notch filter.

3. The system of claim 1, further comprising an amplifier coupled between the signal converter and the MEMS device.

4. The system of claim 1 wherein the signal converter is a look up table.

5. The system of claim 1 wherein the signal converter produces an output that is proportional to a square root of the position signal.

6. The system of claim 1 wherein the actuators include one or more combdrives.

7. The system of claim 1 wherein the actuators include one or more un-balanced uni-directional rotators comprised of either a down-force or an up-force vertical combdrive on either side or on both sides of a rotating axis.

8. The system of claim 1 wherein the bi-axial linkages include a bi-axial linkage having a first flexure beam configured to flex about a first axis, a second flexure beam attached to the first flexure beam, wherein the second flexure beam is configured to flex about a second axis, wherein the second axis is non-parallel to the first axis, the bi-axial linkage further having a third flexure beam attached to the second flexure beam in a spaced-apart substantially parallel relationship to the second flexure beam, wherein the third flexure beam is configured to flex about a third axis that is substantially parallel to the second axis.

9. The system of claim 8 wherein the first axis is substantially perpendicular to the second and third axes.

10. The system of claim 8 wherein the biaxial linkage is mechanically coupled to the device mount.

11. The system of claim 1 wherein the filter has a substantially flat group delay response.

12. The system of claim 1 wherein the filter is of a type that reduces excitation of the MEMS device at or near a natural resonant frequency $\omega_n$ of the MEMS device or a harmonic or subharmonic of the natural resonant frequency $\omega_n$.

13. The system of claim 1 wherein the filter is implemented as a finite impulse (FIR) filter or infinite impulse response (IIR) filter or a FIR approximation of an IIR filter.

14. A MEMS system, comprising:
 a MEMS device, the MEMS device including a device mount, an actuator coupled to the device mount, wherein the actuator is configured to impart motion to the device mount, wherein the MEMS device has a mechanical response that is approximately proportional to a square of a drive voltage;
 a signal converter adapted to convert a signal representing a desired position of the MEMS device to a voltage;
 a filter coupled to the signal converter;
 wherein an output of the filter or signal converter is coupled to MEMS device to provide the drive voltage,
 wherein the filter is a system inverse filter characterized by a frequency response that is approximately an inverse of a mechanical frequency response of the MEMS device,
 wherein the frequency response of the inverse filter is further characterized by one or more poles at frequencies outside a range of interest.

15. The system of claim 14 wherein the frequency response of the device is further characterized by one or more poles and one or more zeroes, wherein the number of poles is greater than or equal to the number of zeroes.

16. The system of claim 14 wherein the frequency response of the inverse filter is further characterized by two or more poles at frequencies outside a range of interest.

17. A MEMS system, comprising:
a MEMS device, the MEMS device including a gimballess device mount supported by two or more bi-axial linkages with each bi-axial linkage mechanically coupled between the device mount and an actuator, wherein each bi-axial linkage is distinct from the actuator, wherein each bi-axial linkage includes a first flexure beam configured to flex about a first axis and a second flexure beam attached to the first flexure beam, wherein the second flexure beam is configured to flex about a second axis, wherein the two or more bi-axial linkages provide the device mount with two or more degrees of freedom of movement, wherein the bi-axial linkages and device mount are formed from the same device layer,
wherein the MEMS device has a mechanical response that is approximately proportional to a square of a drive voltage;
a signal converter adapted to convert a signal representing a desired position of the MEMS device to a voltage;
a filter coupled to the signal converter, wherein an output of the filter or signal converter is coupled to MEMS device to provide the drive voltage; and
a modulator signal source and a transformer coupled between the MEMS device and the signal converter or filter, wherein the modulator signal source is adapted to apply a modulating signal at a frequency greater than about 5 times larger than the natural mechanical resonant frequency $\omega_n$ to the drive voltage.

18. The system of claim 17 wherein the transformer has a substantially flat response and high voltage gain at around a frequency of the modulating signal and within a bandwidth of the modulating signal.

19. A MEMS system, comprising:
a MEMS device, the MEMS device including a gimballess device mount supported by two or more bi-axial linkages with each bi-axial linkage mechanically coupled between the device mount and an actuator, wherein each bi-axial linkage is distinct from the actuator, wherein the actuator includes one or more balanced rotators comprised of opposing down-force and up-force vertical combdrives on either side of a rotating axis, wherein each bi-axial linkage includes a first flexure beam configured to flex about a first axis and a second flexure beam attached to the first flexure beam, wherein the second flexure beam is configured to flex about a second axis, wherein the two or more bi-axial linkages provide the device mount with two or more degrees of freedom of movement, wherein the bi-axial linkages and device mount are formed from the same device layer,
wherein the MEMS device has a mechanical response that is approximately proportional to a square of a drive voltage;
a signal converter adapted to convert a signal representing a desired position of the MEMS device to a voltage;
a filter coupled to the signal converter, wherein an output of the filter or signal converter is coupled to MEMS device to provide the drive voltage.

20. The system of claim 19 wherein the actuator includes one or more balanced bi-directional rotators comprised of opposing down-force and up-force vertical combdrives on either side of a rotating axis, respectively.

21. A MEMS system, comprising:
a MEMS device, the MEMS device including a gimballess device mount supported by two or more bi-axial linkages with each bi-axial linkage mechanically coupled between the device mount and an actuator, wherein each bi-axial linkage is distinct from the actuator, wherein each bi-axial linkage includes a first flexure beam configured to flex about a first axis and a second flexure beam attached to the first flexure beam, wherein the second flexure beam is configured to flex about a second axis, wherein the second axis is non-parallel to the first axis, the bi-axial linkage further having a third flexure beam attached to the second flexure beam in a spaced-apart substantially parallel relationship to the second flexure beam, wherein the third flexure beam is configured to flex about a third axis that is substantially parallel to the second axis, wherein the first second and third flexure beams are characterized by substantially different coefficients of torsional stiffness, wherein the two or more bi-axial linkages provide the device mount with two or more degrees of freedom of movement, wherein the bi-axial linkages and device mount are formed from the same device layer,
wherein the MEMS device has a mechanical response that is approximately proportional to a square of a drive voltage;
a signal converter adapted to convert a signal representing a desired position of the MEMS device to a voltage;
a filter coupled to the signal converter, wherein an output of the filter or signal converter is coupled to MEMS device to provide the drive voltage.

22. The system of claim 10 wherein the biaxial linkage is mechanically coupled to the device mount by a beam attached at a first end to the third flexure beam and attached at a second end to the device mount.

* * * * *